Patented May 30, 1933

1,911,631

UNITED STATES PATENT OFFICE

HAROLD L. LEVIN, OF NUTLEY, NEW JERSEY, ASSIGNOR TO THE FLINTKOTE CORPORATION, OF BOSTON, MASSACHUSETTS, A CORPORATION OF MASSACHUSETTS

FLOORING COMPOSITION AND METHOD OF PRODUCING THE SAME

No Drawing.  Application filed May 21, 1930. Serial No. 454,521.

This invention relates to flooring compositions and methods of producing the same.

It has been heretofore proposed to make flooring and similar compositions from mixtures of bituminous emulsions with a fine mineral aggregate such as sand, and fibre such as wool or asbestos. In this type of composition, rigidity of the structure is secured as a result of dehydration whereupon the adhesive character of the bitumen manifests itself in serving to cement the structure into a unitary mass.

It has also been proposed to combine with mixtures as aforedescribed a hydraulic binder or cement, as for example, Portland cement, which is used in such quantity in relation to the other ingredients as to bring about a chemical bonding of the mineral aggregate of the mix due to the chemical combination of the hydraulic cement with the water present in the composition. In this type of structure the dispersed bitumen functions as a filler during the setting stage and subsequently as a binder to impart coherence and toughness to the dried and completely set structure. Analogous to this type of composition are those wherein chemical reactants function to cause setting of the composition, as typified by the so-called magnesite cements which generally consist of mixtures of magnesium oxide with magnesium chloride. In this type also, the bitumen acts initially as a filler, and finally, after evaporation of extraneous water, as a binder to impart cohesion and toughness.

In all of the aforementioned types of compositions, several objectionable features manifest themselves after exposure to traffic or service conditions. For example, floors made from any of these mixtures with bituminous emulsion exhibit a high-degree of plasticity while possessing very slight or practically no resiliency. Further, due to the more or less permanent adhesive qualities of the bitumen ordinarily employed in these compositions, the flooring structures readily become soiled and allow the dirt to be ground into the surface. Still another objectionable feature is that the color of the finished flooring is black or nearly so due to the color limitation of the asphalt or similar bitumen contained therein, thus restricting the use of these compositions to industrial floors.

The principal object of the present invention is to provide a novel type of flooring composition which will overcome the difficulties above mentioned, and generally, to bring about an improved type of mastic flooring composition and improved methods of making the same.

In one mode of carrying out the invention, I may make a mixture of sand or cork or similar fine aggregate, and an aqueous dispersion of rubber and preferably also a reinforcing fibre such as wool or asbestos. The mixture should contain sufficient of the dispersed rubber to fill the voids in the aggregate and to cement the aggregate upon dehydration of the mix. A typical mix of this character may comprise one part by volume of the rubber dispersion containing 40 to 50 percent of water, one and one-half to three parts by volume of sharp sand, free from any substantial quantities of fines such as might pass through a 100 mesh screen, and about one-half part by volume or less of loosely packed mineral fibre. These ingredients may be stirred into a homogeneous mix, using sufficient water to produce a mortar-like consistency and the mixture may then be applied in any convenient way, preferably by trowelling, to a suitable flooring base, primed if necessary to secure adhesion.

In the aforementioned composition, the rubber dispersion is preferably of the so-called unstable or sticky type, that is to say, one which dries to form a comparatively adhesive film. One manner of producing a rubber dispersion of this type consists in forming a water-in-rubber dispersion by gradually working a water-wetted colloid into the rubber to effect substantially complete dispersion of the water-wetted colloid in the rubber and subsequently working sufficient additional water into the mass until a change of phase occurs and the rubber becomes dispersed as fine particles in the water, now constituting the continuous or external phase of the system. The colloid to be employed for making the rubber dispersion may preferably comprise a rosin-soap either generated in situ by reaction of rosin with caustic alkali or separately prepared. The rubber ingredient of the dispersion is preferably reclaim, although any form of crude rubber may be dispersed by this method.

Another mode of practicing my invention consists in making a mixture of hydraulic cement, aggregate, and rubber dispersion, in the proportion of about one volume of Portland cement, one and one-half to two and one-half volumes of rubber dispersion containing 40 to 50 percent water, and three to five volumes of the aggregate in the form of finely divided grains or suitably graded mixtures of fine and coarse aggregate. If desired, small proportions of suitable reinforcing fibre may also be incorporated into the mix. The ingredients are mixed into a homogeneous mass using sufficient quantities of gaging water to afford the desired trowelling consistency. On the basis of a rubber dispersion containing approximately 50% water, it will be seen that the amount of rubber in the compositions as here given, on the dry weight basis, may range from approximately 12 to approximately 20%, depending upon the nature of the aggregate. Calculated on the amount of cement in the composition, the rubber may vary from 40 to 80 percent by weight, while in general, the aggregate when of mineral character will exceed in weight the total of the cement and rubber. In some instances it may be desirable to incorporate a small proportion of a substance such as calcium chloride in order to accelerate the "set" of the composition after it is laid.

Since, in the type of composition last described, the actual binding and cohesion of the mass are effected through the agency of the hydraulic cement, it is desirable to use a so-called stable type of dispersion of rubber in order that the rubber particles may remain satisfactorily dispersed through the mass without appreciable flocculation or agglomeration until the mass has attained a rigid "set" whereupon the fluxing of the rubber particles ensues by virtue of the decrease in the surface tension relationship between the rubber and the aggregate. A stable dispersion of rubber in water such as may conveniently be employed in this type of flooring mastic, may be produced by dispersing a plasticized rubber with the aid of an aqueous paste of a colloidal material such as bentonite, starch, or the like.

According to a further embodiment of the invention, the mastic flooring mix may consist of suitable proportions of magnesite and magnesium chloride or similar reactants, together with fine mineral aggregate, such as silex, bulking aggregates such as sawdust or cork, and an aqueous dispersion of rubber. In this type of composition, the rubber dispersion may be of the stable type such as described in the preceding example or it may be of the unstable or sticky type such as employed in the first example given, but rendered stable by incorporation therein of suitable protective colloids such as bentonite, alkali caseinates, or mixtures thereof.

The flooring systems as developed from the compositions as herein described possess numerous advantageous physical and chemical characteristics which mark them as distinctly superior in point of service, utility, and appearance. Among these may be mentioned their high degree of resiliency against shock resistance to abrasion, freedom from slipperiness, wide latitude in color by incorporation of suitable pigments. Noteworthy also are the sound-deadening and heat insulative properties of the finished structure.

Another important advantage of the flooring compositions made according to my invention is the ability to obtain a vulcanized structure either throughout the mass by incorporating suitable vulcanizing agents and vulcanization accelerators in the mix, or on the surface of the finished floor by treating the upper layer of the finished floor with a suitable so-called "cold cure" agent.

It will be understood that any well known anti-oxidant may be incorporated either in the rubber prior to the dispersion thereof, or subsequently into the dispersion, or in the mix, in such proportions as are customarily employed for preventing premature oxidation or polymerization of the rubber hydrocarbon. Likewise, it will be understood that bitumen may be used in combination with the rubber, either by fluxing the two prior to dispersion, or by mixing separately prepared dispersion of rubber and of bitumen, in such proportions as will not obscure or negate the rubber characteristics of the structure.

While I have herein referred to the adaptability of the compositions described for use as flooring mastic, it will be evident to those skilled in the art, that these compositions may be applied to numerous other uses, as for example, wall structures traffic indicators, etc.

I claim as my invention:

1. A composition of matter suitable as a flooring mastic comprising a homogeneous mixture of hydraulic cement, fine mineral aggregate, and rubber in aqueous dispersion, the proportions of the ingredients being such that the rubber content is substantially equal to about one-half the weight to the hydraulic cement contained in the mix and the weight of the aggregate is in excess of the total weight of rubber and cement.

2. A composition of matter suitable as a flooring mastic comprising a homogeneous mixture of hydraulic cement, fine mineral aggregate, and rubber in aqueous dispersion, the proportions of the ingredients being such that the rubber content is substantially equal to about one-half the weight to the hydraulic cement contained in the mix and the weight of the aggregate is in excess of the total weight of rubber and cement, said composition being of trowelling consistency.

3. A composition of matter suitable as a flooring mastic comprising a homogenous mixture of hydraulic cement, fine mineral aggregate, and rubber in aqueous dispersion, the said ingredients of the mix being substantially in the proportions of one part hydraulic cement, one and one-half to two and one-half parts rubber dispersion, and three to five parts aggregate, all by volume.

4. A composition of matter suitable as a flooring mastic comprising a homogeneous mixture of hydraulic cement, fine mineral aggregate, and rubber in aqueous dispersion, the said ingredients of the mix being substantially in the proportions of one part hydraulic cement, one and one-half to two and one-half parts rubber dispersion, and three to five parts aggregate, all by volume, said dispersion containing approximately 50 to 60% by weight of rubber.

5. A composition of matter suitable as a flooring mastic comprising a homogeneous mixture of hydraulic cement, fine mineral aggregate, and rubber in a relatively unstable aqueous dispersion, the said ingredients of the mix being substantially in the proportions of one part hydraulic cement, one and one-half to two and one-half parts rubber dispersion, and three to five parts aggregate, all by volume, said dispersion containing approximately 50 to 60% by weight of rubber.

In testimony whereof I affix my signature.

HAROLD L. LEVIN.